(12) United States Patent
Mays et al.

(10) Patent No.: US 9,616,743 B1
(45) Date of Patent: Apr. 11, 2017

(54) COOLING AIR FLOW SYSTEM

(71) Applicant: BorgWarner Inc., Auburn Hills, MI (US)

(72) Inventors: Christopher J Mays, Bloomfield, MI (US); Andrew D Sutherland, Birmingham, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/364,342

(22) Filed: Nov. 30, 2016

(51) Int. Cl.
| | | |
|---|---|---|
| *B60R 22/00* | (2006.01) | |
| *B60K 11/08* | (2006.01) | |
| *B60K 11/06* | (2006.01) | |
| *G05D 1/02* | (2006.01) | |

(52) U.S. Cl.
CPC ............ *B60K 11/085* (2013.01); *B60K 11/06* (2013.01); *G05D 1/0295* (2013.01); *G05D 2201/0216* (2013.01)

(58) Field of Classification Search
CPC combination set(s) only.
See application file for complete search history.

(56) References Cited

U.S. PATENT DOCUMENTS

| | | | |
|---|---|---|---|
| 2011/0043375 A1* | 2/2011 | Tanaka | B60C 23/0408 340/870.07 |
| 2011/0083451 A1* | 4/2011 | Kwon | B60H 1/00764 62/61 |
| 2015/0134156 A1* | 5/2015 | Henry | B61C 17/12 701/19 |
| 2016/0201533 A1* | 7/2016 | Upadhyay | F01N 3/0232 701/102 |

\* cited by examiner

*Primary Examiner* — Hussein A. Elchanti
(74) *Attorney, Agent, or Firm* — Bejin Bieneman PLC

(57) ABSTRACT

A first moving vehicle is maintained in a first position relative to a second moving vehicle. The first and second vehicles comprise a platoon. An engine compartment airflow control apparatus is activated in the first vehicle, responsive to an indicator of engine temperature. The first vehicle is moved to a second position relative to the moving second vehicle or the temperature control apparatus is activated, responsive to the indicator of engine temperature.

20 Claims, 7 Drawing Sheets

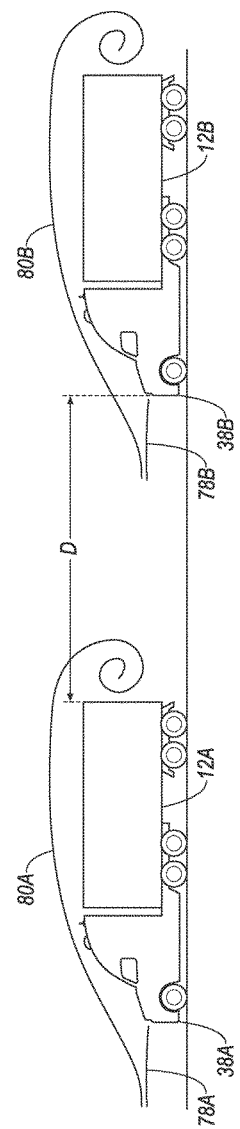
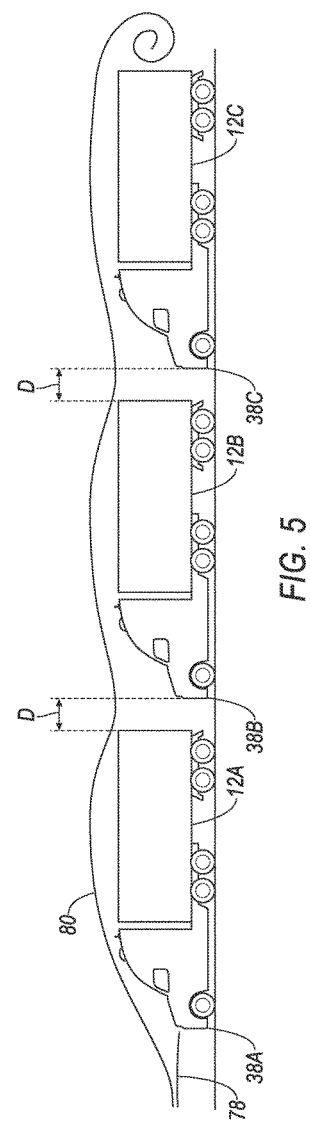

COOLING AIR FLOW SYSTEM

BACKGROUND

Platooned vehicles, particularly trailing vehicles, may lose some of the efficiency benefits of platooning by operating an air flow control apparatus such as a cooling system fan to compensate for a loss of ram air.

BRIEF DESCRIPTION OF THE DRAWINGS

FIG. 4 is a side view of exemplary non-platooned vehicles.

FIG. 5 is a side view of exemplary platooned vehicles.

DETAILED DESCRIPTION

Introduction

A first moving vehicle is maintained in a first position relative to a second moving vehicle. The first and second vehicles comprise a platoon. An engine compartment airflow control apparatus is activated in the first vehicle, responsive to an indicator of engine temperature. The first vehicle is moved to a second position relative to the moving second vehicle or the temperature control apparatus is activated, responsive to the indicator of engine temperature.

Relative orientations and directions (by way of example, upper, lower, bottom, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver seat, facing a dashboard. In the figures, like numerals indicate like parts throughout the several views.

Exemplary System Elements

Figure 1:
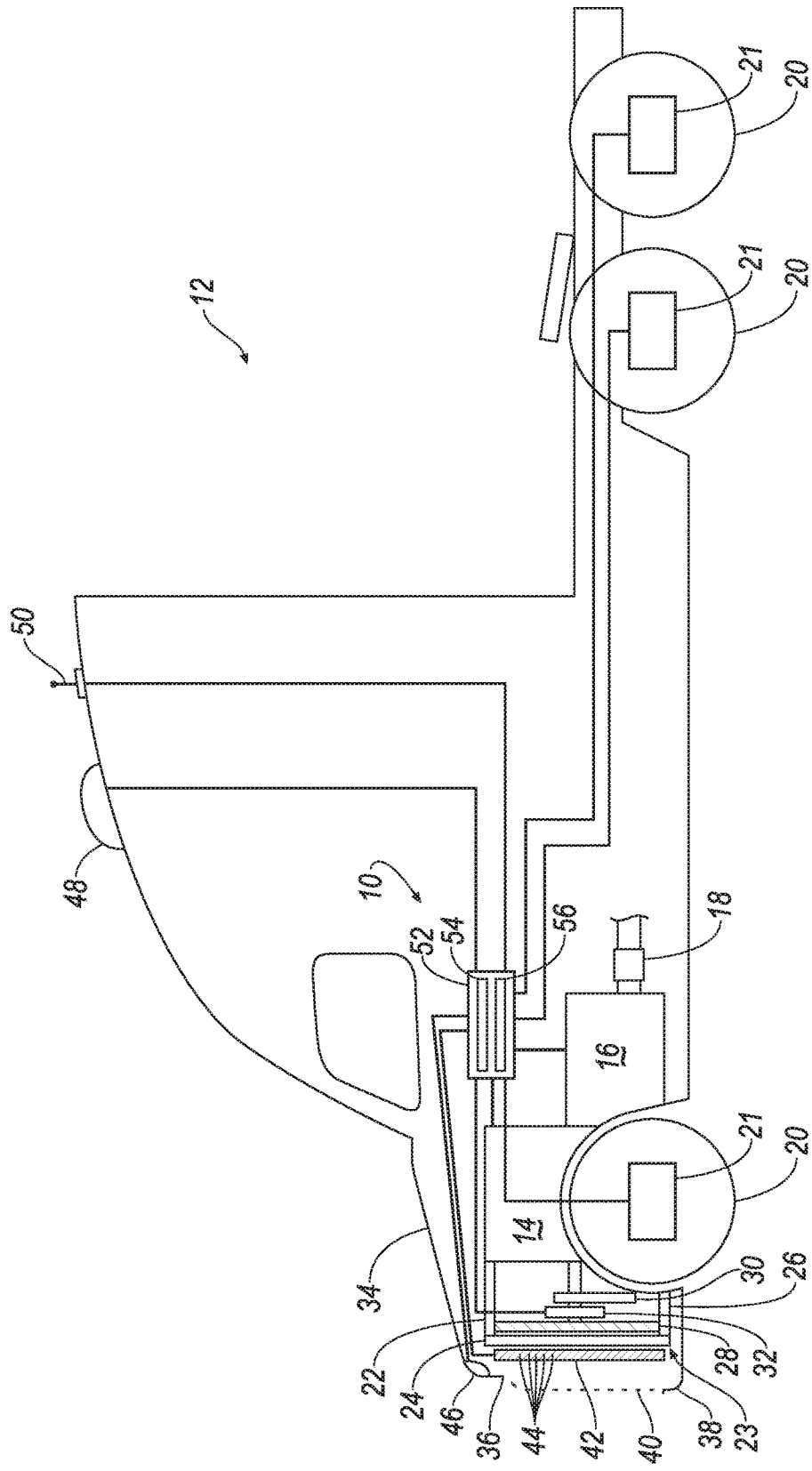
FIG. 1 schematically illustrates an example first vehicle incorporating an example cooling system and air flow system.

FIG. 1 schematically illustrates an example air flow system 10 incorporated into a vehicle 12.

Vehicle 12 includes a powertrain comprising an internal combustion engine 14 and a transmission 16 drivingly coupled to engine 14. An output shaft 18 of transmission 16 is drivingly connected to drive wheels 20 which are among wheels 20. Wheels 20 may be associated with brake actuators 21.

Exemplary engine 14 is liquid cooled and has a known cooling system 23. The purpose of liquid cooling system 23 is to maintain engine 14 at a stable operating temperature. Cooling system 23 is described briefly to provide context for air flow system 10 as described herein. Liquid coolant (not shown) is circulated through a water jacket of the engine 14 with heat from engine 14 being transferred to the coolant. Hot coolant flows from the water jacket of engine 14 through a first hose 22 to and into a liquid-to-air heat exchanger, commonly called a radiator 24. A second hose 26 communicates cooled coolant to a pump (not shown). The pump returns the coolant back to engine 14, completing a travel circuit of the coolant.

A known example construction of radiator 24 includes a radiator core having cooling tubes and cooling fins. Coolant travels through the radiator tubes. Air is able to pass through radiator 24, past the tubes and fins. When a temperature of the air is less than a temperature of the coolant, heat energy may be transferred from the coolant passing through the tubes to the air passing through the radiator 24. For a given air temperature less than a given coolant temperature, an increase in a volumetric rate of air flow through the radiator increases a rate of removal of heat from coolant passing through the radiator 24.

Air flow system 10 provides ambient cooling air to radiator 24 of cooling system. As certain components may be identified as parts of either air flow system 10 or liquid cooling system 23, such association herein is made for the purpose of consistently identifying such parts and is not intended to be restrictive of the understanding of the function of such parts. For example, an exemplary fan 28 may be considered part of the cooling system 23, but for the purpose of this discussion, will be considered part of air flow system 10. System 10 may include additional parts that will be discussed in more detail below, such parts including a fan clutch 32, a grille 40, a grille shutter 42, sensor 46, a sensor module 48, an antenna, and an electronic control unit ("ECU") 52.

Exemplary fan 28 is provided to selectively increase a volumetric flow of air through radiator 24 beyond a flow of air provided by ram air. Ram air is air that passes through a forward facing opening, such as exemplary grille 40, attributable to a forward movement of vehicle 12. Fan 28 may be activated to increase air flow through the radiator 24 when there is insufficient ram air to maintain the engine at or below a predetermined coolant temperature threshold. An exemplary temperature threshold may be 99 degrees Celsius. The exemplary coolant temperature threshold may be an indicator of or a proxy for a predetermined engine temperature. Alternative temperature proxies include a temperature of lubrication oil disposed in the engine. Indicators of other vehicle system operating temperatures, e.g. transmission fluid temperature, air conditioning fluid pressure, and charge air cooling systems, may also be monitored for evidence of adequate cooling. Fan 28 may be mechanically driven by engine 14 through selectively engaged fan clutch 32, or may alternatively be driven by an electric motor (not shown).

When mechanically driven, fan 28 may be connected to a pulley (not shown) comprising part of an accessory drive 30 and driven by engine 14. Such accessory drives 30 are known, and often employ a belt and pulley system. An exemplary belt and pulley system is a serpentine drive system. Fan 28 may be selectively drivingly connected to and disconnected from accessory drive 30 by fan clutch 32. Exemplary fan clutch 32 is selectively engaged and disengaged to connect and disconnect fan 28 to and from accessory drive 30 responsive to an electronic signal. The rotation of fan 28 to draw air through radiator 24 may require a significant amount of power from engine 14, an exemplary range being 50 to 70 horsepower.

When driven by an electric motor (not shown) instead of an accessory drive 30, fan 28 does not require a clutch 32. Fan 28, when driven by the electric motor, may require similar amounts of power to that provided by engine 14 to drive fan 28 through accessory drive 30. Power to the electric motor may be provided by any one of an electrical power generator (not shown) driven by engine 14, and by electrical power storage devices such as batteries or capacitors charged by such a generator.

A vehicle body shell 34 may include a cooling opening or aperture 36 in a front end 38 of body shell 34. Aperture 36 may be substantially aligned with radiator 24 and may present a similar size and shape as radiator 24. Grille 40 is fixed within aperture 36. Grille 40 has a structure that allows air to pass through and while blocking debris from entering an engine compartment behind grille 40. The grille structure is a matter of design choice. Example structures include a wire mesh, a plurality of bars oriented horizontally or vertically, and a plastic grid. The examples listed are not comprehensive.

Exemplary grille shutter 42 may be disposed between grille 40 and radiator 24. Alternatively, grille shutter 42 may be placed outside of grille, opposite radiator 24. Yet alternatively, grille shutter 42 may be integrated into grille 40. A further alternative location for grille may be between fan 28 and radiator 24. Grille shutters 42 are known. Grille shutter 42 includes a plurality of parallel shutter louvers 44. Louvers 44 are selectively pivotable by an electric actuator forming part of grille shutter 42 between an open position, allowing air to flow through radiator 24, and a closed position, restricting or blocking air from passing through grille 40 and radiator 24.

Vehicle 12 may also include an active side air intake (not shown). The active side air intake may be disposed in a side panel of body shell 34, proximate to engine 14. When not needed, the active side air intake may be in an undeployed orientation, presenting an outer surface flush with the side panel. When additional air flow is needed, the active side air intake may pivot or otherwise extend from the side panel to present a forward-facing intake area to capture on-coming air.

Vehicle 12 also includes equipment for its operation in an adaptive cruise control ("ACC") mode of operation and a cooperative adaptive cruise control mode of operation ("CACC") mode. Such equipment may include a plurality of vehicle situational awareness sensors. One exemplary vehicle situational awareness sensor may be a forward object sensor that may be in the form of forward radar sensor 46. Additional radar sensors may also be employed to detect objects around an entire periphery of vehicle 12. Other sensors may be disposed elsewhere in the vehicle (e.g. on the roof, in or behind the grille, the front of the truck, etc.), with one example location being in exemplary roof-mounted sensor module 48. Such other sensors may include vehicle context and position sensors and location sensors such as a LIDAR sensor, a vision sensor (e.g., a camera), a global positioning system ("GPS") sensor, antennae and the like. Radar sensors may be used both for locating other objects, and for, by exploiting the Doppler effect, determining a relative velocity of such other objects. The foregoing examples are not intended to be limiting.

An antenna 50 suited for use with a dedicated short range communications ("DSRC") system may be used to support vehicle-to-vehicle ("V2V") and vehicle-to-infrastructure ("V2I") communications. V2V communications capabilities allow vehicle 12 to communicate with other vehicles, and adjust vehicle spacing accordingly in anticipation of, by way of example, upcoming traffic issues. V2I communications capabilities allow interactive infrastructure devices, such as intersection controller, to communicate with vehicle 12. For example, vehicle 12 may be warned of an imminent intersection signal change requiring a change in speed. Alternatively, when vehicle 12 is an authorized emergency response vehicle, such as a fire truck, vehicle 12 may be able to command an intersection signal change giving a right-of-way to vehicle 12. CACC capable vehicles may be distinguished from ACC vehicles in that CACC vehicles may be further enhanced with V2V and V2I communications capabilities.

Both ACC and CACC capable vehicles may have some ability to anticipate or predict upcoming variations in road conditions and terrain. Example road conditions include traffic and weather-related road surface conditions. Terrain may include changes in road grade, reduced lane width, and road curvature. Both an ACC capable vehicle and a CACC capable vehicle may store or have access to three dimensional map data that, together with the use of GPS, allows exemplary ECU to predict, for example, when road grade and road curvature changes may require a change in vehicle speed and/or engine power output. Another level of predictions may be achieved when vehicles benefit from one or both of V2V communications and communications with a cloud based network. Such communications allow the vehicle to anticipate traffic conditions, such as traffic jams, and road conditions, such as icy roads. The identified changes may impact an ability to maintain vehicles in a platoon as well as engine cooling needs. Being able to predict the occurrence of such changes allows for better system power management and an optimization of fuel economy.

Vehicle 12 includes a computing device or computer in the form of exemplary ECU 52 for operating air flow system 10. ECU 52 may also be used to operate other vehicle systems, and to operate vehicle 12 in the ACC mode and in the CACC mode. ECU 52 includes an electronic processor 54 and an associated memory 56. The memory 56 of ECU 52 includes one or more forms of computer-readable media, and stores instructions executable by the processor 54 for performing various operations, including such operations as disclosed herein. ECU 52 includes programming to operate vehicle 12 in both ACC and CACC modes of operation.

Figure 2:
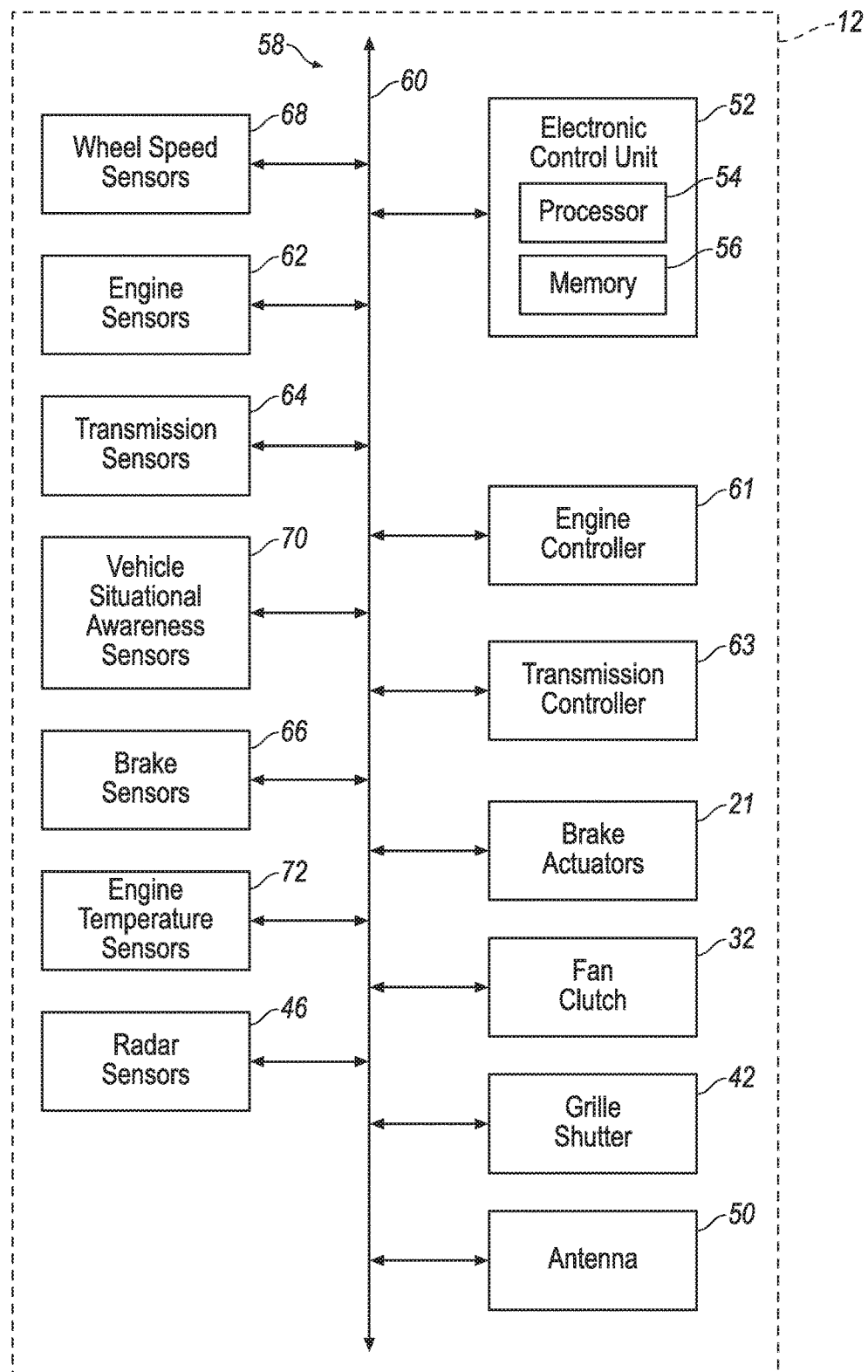
FIG. 2 schematically illustrates a control system network for the vehicle of FIG. 1.

FIG. 1 shows system components including fan clutch 32 and grille shutter 42 as being electrically connected directly to ECU 52. Alternatively, vehicle 12 may further include a vehicle network 58 including one or more communications media such as an example system controller area network ("CAN") bus 60 as illustrated in FIG. 2. Bus 60 provides a transmission media between and connecting elements of system 10 including ECU 52 and components and ancillary systems including, by way of example, an engine controller 61 for engine 14, engine sensors 62, a transmission controller 63 for transmission 16, transmission sensors 64, a plurality of brake actuators 21, brake sensors 66 which may include wheel speed sensors, vehicle situational awareness sensors 70 that may be disposed in sensor module 48, engine temperature sensors 72, fan clutch 32, antenna 50, and radar sensor 46.

System 10 controls cooling air flow to an engine heat exchanger by selectively modulating one or more flow enhancers, e.g. fan clutch 32 and grille shutter 42 and the active side air intake, and by positioning vehicle 12 relative to a second vehicle's position and one or more flow enhancers of the vehicle responsive to an input variable related to engine temperature.

The memory 56 of ECU 52 also stores data. Data may include collected data that is collected from a variety of devices. In general, collected data may include any data from an appropriate map database, and any data that may be gathered by any data collection device including engine sensors 62, transmission sensors 64, wheel speed sensors 68, situational awareness sensors 70 including radar sensor 46, engine temperature sensors 72, and/or data computed from such data. The foregoing examples are not intended to be limiting. Other types of data collection devices may be used to provide data to ECU 52. Data may also include calculated data calculated in ECU 52 from collected data and from other calculated data.

A high definition map and navigation data file may be included in memory 56. The navigation data file may communicate map data to ACC or CACC software to determine appropriate commands or instructions to communicate to systems and components including the programming for the air flow system 10. The CACC software may also anticipate future locations, speeds, and accelerations of vehicle 12 based in part on braking signals, torque demand signals, and steering signals. Such anticipated locations, speeds, and accelerations may be shared with other vehicles and with any interactive infrastructure devices, including by way of example, intersection controller 16.

ECU 52 may be configured for communications on a vehicle network 58 such as an Ethernet network or the CAN bus 60 or the like, and/or for using other wired or wireless protocols, e.g., Bluetooth®, Bluetooth® Low Energy, or WiFi. ECU 52 may also have a connection to an onboard diagnostics connector such as an OBD-II connector. Via the CAN bus 60, OBD-II, Ethernet, and/or other wired or wireless mechanisms, ECU 52 may transmit messages to various devices in a vehicle and/or receive messages from the various devices, e.g., controllers, actuators, sensors, switches, etc. as discussed herein. Although ECU 52 is shown as a single ECU in FIG. 1 and FIG. 2 for ease of illustration, it is to be understood that ECU 52 could in fact include, and various operations described herein could be carried out by, one or more computing devices, e.g., vehicle component controllers such as are known and/or a computing device dedicated to the discrete brake actuators 21, engine 14, transmission 16 and fan clutch 32.

Figure 3:
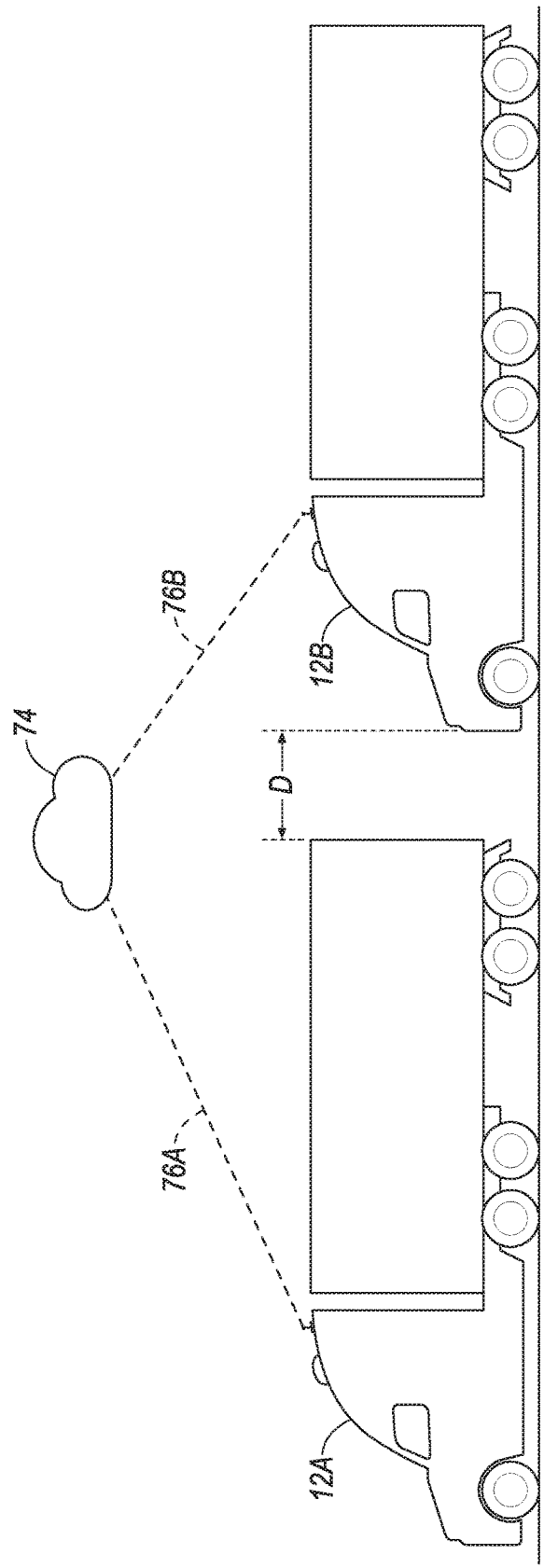
FIG. 3 schematically illustrates an example platooning network including a plurality of vehicles like the vehicle of FIG. 1.

FIG. 3 illustrates two vehicles, 12A and 12B, in a platooned formation. Vehicles, particularly commercial vehicles including trucks, may realize cost savings by directing vehicles platoon or closely follow one another in groups of two or more vehicles. Such cost benefits may be attributable to an ability to draft off of a leading vehicle. Drafting reduces a collective aerodynamic drag of the platooned vehicles. More specifically, drafting reduces front-end aerodynamic drag load of the following vehicle 12B. It also reduces a rear-end aerodynamic drag load of lead vehicle 12A by substantially reducing turbulence at a rear-end of lead vehicle 12A. Vehicles 12A and 12B may include both a truck tractor and a truck trailer as is known with the rear-end of such a vehicle being a rear-end of the associated trailer. There is an optimal magnitude of a distance D between vehicles 12A and 12B that maximizes the savings. The optimal magnitude of distance D may vary with the speed of vehicles 12A and 12B.

The distance D may be much less than a human driver alone would be able to safely maintain. Vehicle 12 is allowed by the above-described features, including sensors such as radar sensor 46 and the sensors disposed in module 48, and also including computer control of brake actuators 21 and engine 14 and transmission 16, to safely maintain a trailing vehicle at a position closer to a lead vehicle than a human driver is able to. The V2V and V2I communications capabilities enhance the platooning capabilities of vehicles 12 so equipped. An exemplary enhancement is a smoother change in vehicle velocity when approaching a congested section of road, as the V2V communications capabilities provide notice of obstructions that may be beyond a range of vehicle 12's sensors.

Platooning may be coordinated by a cloud-based network operations center 74 as illustrated in FIG. 3. The network operations center 74 may determine, based in part on data provided by vehicles 12A and 12B via communication channels such as radio communication channels 76A and 76B, when it is safe to platoon and how many and which vehicles may be platooned at a given time. Such vehicles, when driven by human operators, may incorporate a driver acknowledgment and approval of such platooning. V2V communication also plays a role in establishing and maintaining platoon formations.

While platooning will improve the fuel economy of the platooned vehicles, it may make it more difficult for liquid cooling system 23 to maintain a stable engine temperature. FIG. 4 illustrates vehicles 12A and 12B separated by a distance D greater than a distance at which drafting benefits are achieved. Each of vehicles 12A and 12B has a portion, 78A and 78B respectively, of an air flow, 80A and 80B respectively, impinging on its front end 38A and 38B. For non-drafting vehicles, air flow portions 78A and 78B may provide a sufficient flow of air through radiator 24 to maintain engine 14 at a stable operating temperature. FIG. 5 illustrates vehicles 12A, 12B, and 12C in a platooned orientation relative to each other, each spaced a distance D apart to provide optimal drafting benefits. While vehicle 12A has air flow portion 78 impinging on its front end 38A, vehicles 12B and 12C do not have sufficient air flow impinging on front ends 38B and 38C because of the air flow 80 resulting from drafting.

Processing

Figure 6A:
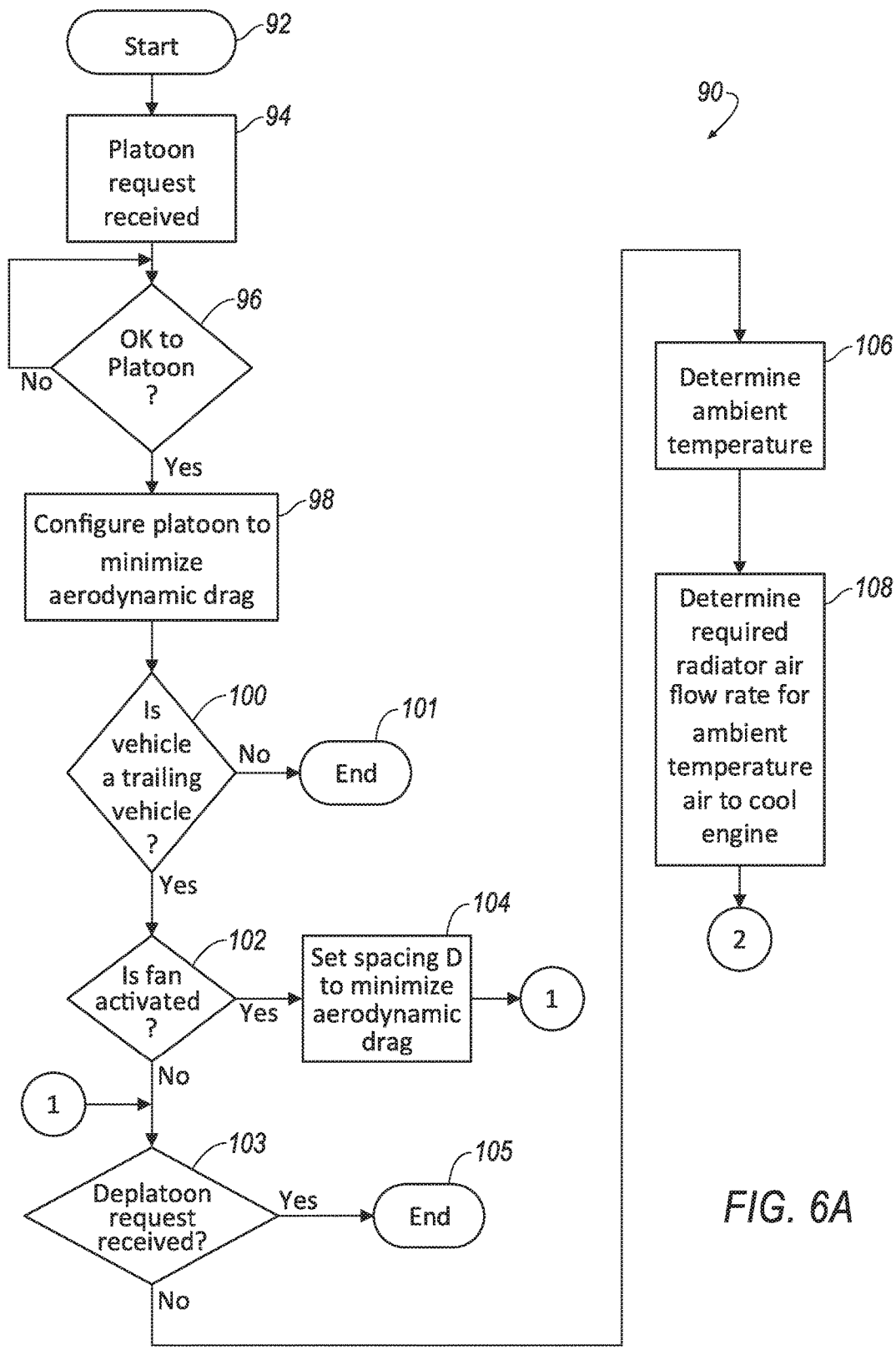
FIG. 6A illustrates a first portion of a flow chart of example instructions for managing air flow.
Figure 6B:
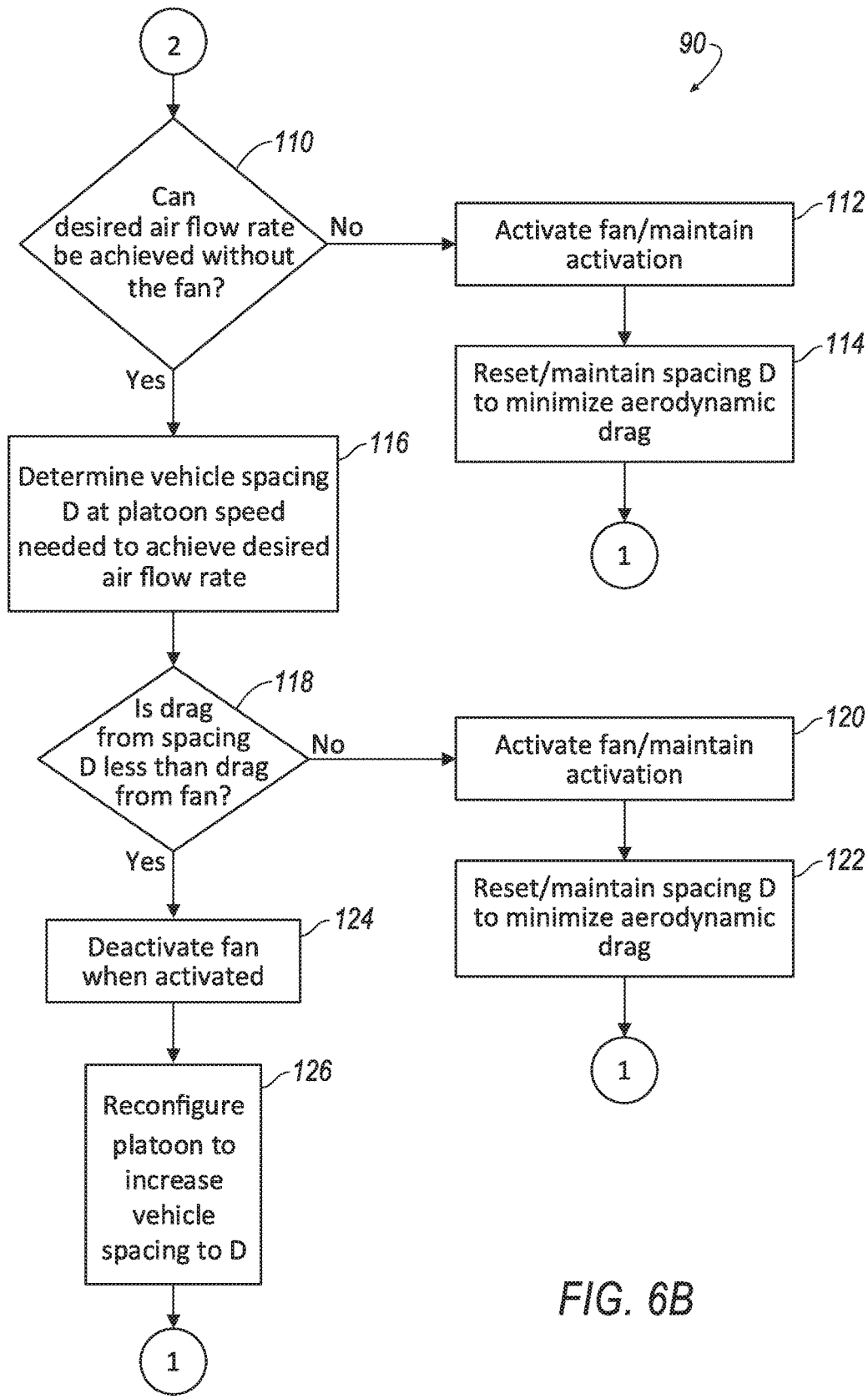
FIG. 6B illustrates a second portion of a flow chart of example instructions for managing air flow.

FIG. 6A and FIG. 6B illustrate an exemplary air flow management process 90 stored in ECUs 52 of vehicle 12, 12A, 12B, and 12C of FIGS. 1-4 and FIG. 7 that allows management of air flow, including air flow through radiator 24, consistent with the air flow management process 90. ECU 52 executes the steps illustrated in FIG. 6A and FIG. 6B, and as demonstrated in FIGS. 4, 5, and 7 as described below. A computer program for executing process 90 is instantiated in start block 92, e.g., when any of vehicles 12, 12A, 12B, 12C begin driving on a roadway.

Next, a request to platoon received from the network is recognized in process block 94. Process 90 then moves to decision block 96. Decision block 96 determines when it is permissible to platoon. In determining permissibility, decision block 96 may evaluate values of certain parameters and determine when all or a sufficient number are in an acceptable value range. For example, such parameters may include a value for traffic density, such as a number of vehicles per unit of distance, a number of available traffic lanes in a direction of travel, a number of intersections per unit of distance, a percentage of vehicles proximate to a proposed platoon equipped with V2V and V2I communications capabilities, weather conditions, tire conditions, brake conditions, visibility range of instruments for the incipient conditions, and other conditions as may be identified. When a determination is made that platooning is not appropriate, process 90 may move back to decision block 96 to reassess whether platooning is permissible. As the determination of permissibility may also depend on the value of gap D, decision block 96 may establish a value of D consistent with safe platooning given the other parameters considered. When it is determined that platooning is permissible, process 90 moves to process block 98.

Process block 98 initiates platooning, with vehicles, exemplary vehicle being vehicles 12A and 12B and 12C, being aligned in a single lane, and being spaced with a gap D equaling the optimal spacing for maximum cumulative aerodynamic drag reduction. Depending in part on the shape of vehicles 12A, 12B, and 12C, the optimal gap D may vary between vehicles. An exemplary optimal distance D for ideal conditions may be 30 feet. With vehicles positioned relative to each other to achieve a maximum cumulative aerodynamic drag reduction, process 90 moves to decision block 100.

Decision block 100 determines if a vehicle is a trailing vehicle. When a vehicle, such as vehicle 12A, is a non-trailing or a leading vehicle of a platoon, process 90 moves to end block 101 and terminates. When a vehicle, such as 12B or 12C, is a trailing vehicle, process 90 moves to decision block 102.

Decision block 102 determines if fan 28 is activated to draw air through radiator 24, consistent with clutch 32 being engaged or an electric motor driving fan 28 being activated. When decision block 102 determines that fan 28 is not activated, process 90 moves to decision block 103. When decision block 102 determines that fan 28 is activated, process 90 moves to process block 104. Process block 104 sets the spacing D to a value minimizing aerodynamic drive. Process 90 moves from process block 104 to decision block 103.

Decision block 103 determines when a request to deplatoon has been received. When such a request has been received, process 90 moves to end block 105 and terminates. When block 103 determines that a request to deplatoon has not been received, process 90 moves to process block 106.

Process block 106 determines an ambient air temperature at the location of the vehicles 12A, 12B, 12C. Process 90 moves to process block 108 after block 106. Process block 108 determines a volumetric magnitude of air flow through the radiator 24 required to cool the engine to an acceptable temperature. Such magnitude of air flow may be identified as a desired air flow rate. Process 90 then moves to decision block 110.

Decision block 110 determines whether it is possible for the desired air flow rate to be achieved without activation of fan 28. Such a determination may require information and data unique to each vehicle. Some such data may be available by measuring an area of grille 40 and an area of radiator 24. Other data may be generated in real time, or alternatively may be generated in advance and stored in memory 56 or stored elsewhere and made available through the vehicle networks operation center 74. Such data may include the available flow through the grille at several discrete vehicle speeds. Such flow data may be further segmented to simulate having a leading vehicle in front of front end 38 at several different discrete distances. Such data may be obtained through computer simulation using simulation of fluid flow. Alternatively, such data could be generated or supplemented by test data generated with wind tunnels or with road testing.

When decision block 110 determines that the desired air flow rate cannot be achieved without operation of fan 28, process 90 moves to process block 112. Process block 112 directs that fan 28 either be activated or maintained in the activated condition. Process 90 then moves to process block 114 which directs that vehicles 12B and 12C maintain or reset the spacing between the vehicles to a value of D minimizing aerodynamic drag, as the fan will need to operate no matter what the vehicle spacing is. Following process block 114, process 90 moves back to decision block 103.

When decision block 110 determines that the desired air flow rate can be achieved without operation of fan 28, process 90 moves to process block 116. Process block 116 determines a vehicle spacing D, given a current or targeted speed of the platoon of vehicles 12A, 12B, and 12C, that will provide sufficient air flow without activating fan 28. The velocity or speed of the platoon may be increased or decreased to adjust available ram flow as may be required. Ram flow will generally increase with speed, but in some instances an increase in platoon and vehicle speed may result in a decrease in ram flow. A decrease may occur when a change in speed results in a change in direction of airflow against or around the vehicle. Additionally, distance D may vary for each vehicle as each vehicle may be affected by its aerodynamics and the aerodynamics of other vehicles, such as an immediately preceeding vehicle. Process 90 then moves to decision block 118.

Decision block 118 determines when fuel economy is decreased less by operating with a spacing of distance D (relative to a distance D selected to minimize aerodynamic drag) than by operating fan 28. More specifically, block 118 may determine whether an amount of engine demand associated with the aerodynamic drag of spacing D as calculated in block 116 is less than an amount of engine demand associated with operating fan 28. When no, process 90 moves to process block 120 where fan 28 is activated or maintained in an activated condition. Process 90 then moves to process block 122 which directs that vehicles 12B and 12C maintain or reset the spacing between the vehicles to a value of D minimizing aerodynamic drag. When yes, process 90 moves to process block 124 which alternatively deactivates fan 28 or maintains fan 28 in a deactivated condition.

Following block 124, process 90 moves to process block 126. Process block 126 resets vehicle spacing to the new distance D established by process block 116. Process 90 then cycles back to decision block 103.

Figure 7:
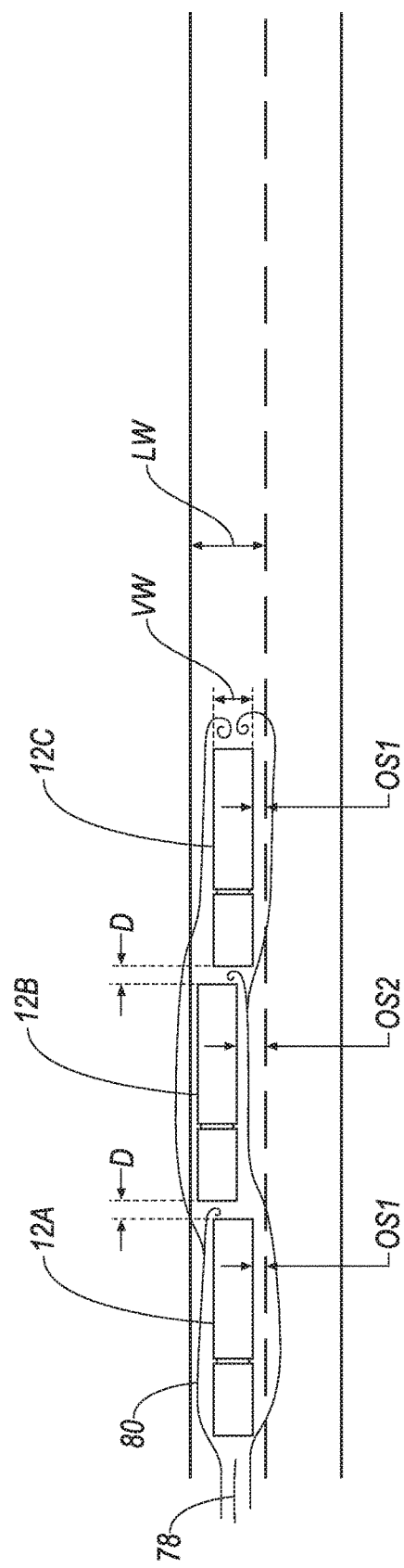
FIG. 7 is a top view of exemplary platooned vehicles.

As an alternative to altering vehicle-to-vehicle spacing D, a lateral offset between vehicles 12A, 12B, and 12C may be used to an amount of flow 80 impinging directly on front ends 38B and 38C. For example, as illustrated in FIG. 7, a first lane occupied by platooned vehicles 12A, 12B, and 12C has a width LW. Vehicles 12A, 12B, and 12C may have a common width VW. Vehicle width VW is less than lane width LW. The vehicles are traveling in a leftward direction, with the air flow 80 relative to vehicles 12A, 12B, and 12C having substantially laminar portions and substantially turbulent portions. An air flow portion 78 impinges on front end 38A. Vehicle 12A and vehicle 12C are relatively close to a left hand lane stripe, with a left side of each vehicle being spaced a distance OS1 from the stripe. Vehicle 12B is offset from the left hand lane stripe by a distance of OS2. Distance OS2 is greater than distance OS1. The potential difference between OS1 and OS2 varies directly with the difference between vehicle width VW and lane width LW. As the difference between LW and VW increases, so may the difference between OS2 and OS1. With a larger available distance between OS2 and OS1, there is less need to increase distance D. Test data and computer simulation data may be used to assess the relative impact on efficiency of lateral vehicle offsets and varying vehicle-to-vehicle distances D relative to losses associated with operating fan 28.

CONCLUSION

An example system and method for optimizing vehicle spacing in platoons has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A system, comprising a computing device including a processor and a memory, the processor configured to:
   maintain a moving first vehicle associated with the processor in a first position relative to a moving second vehicle leading the first vehicle, the first and second vehicles comprising a platoon;
   activate an engine compartment air-flow control apparatus in the first vehicle responsive to an indicator of an engine temperature; and
   move the first vehicle to a second position relative to the moving second vehicle responsive to the indicator of the engine temperature.

2. The system of claim 1, wherein the first position is selected based on reducing a collective aerodynamic drag of the vehicles and further wherein the second position provides less of a reduction than the first position.

3. The system of claim 1, wherein the air-flow control apparatus includes one of a fan and a grille shutter and an active side air intake.

4. The system of claim 3, wherein the air-flow control apparatus is the fan.

5. The system of claim 4, wherein the computing device is further programmed to:
   activate the fan by one of selectively engaging a clutch drivingly connecting the fan to a vehicle engine, and energizing an electric fan motor.

6. The system of claim 1, wherein the computing device is further programmed to:
   select the second position so as to deactivate the air-flow control apparatus.

7. The system of claim 1, wherein the first position is a spacing of the first vehicle behind the second vehicle.

8. The system of claim 1, wherein the first position is a lateral offset of the first vehicle relative to the second vehicle.

9. The system of claim 1, wherein the vehicles are linked to each other through vehicle to vehicle communications.

10. The system of claim 9, wherein the vehicles are linked to a vehicle network beyond the vehicles.

11. A method of managing air flow for an engine compartment, the method comprising the steps of:
    maintaining a moving first vehicle in a first position relative to a moving second vehicle leading the first vehicle, the first and second vehicles comprising a platoon;
    activating an engine compartment air-flow control apparatus in the first vehicle responsive to an indicator of an engine temperature; and
    moving the first vehicle to a second position relative to the moving second vehicle responsive to the indicator of the engine temperature.

12. The method of claim 11, wherein the first position is selected based on reducing a collective aerodynamic drag of the vehicles and further wherein the second position provides less of a reduction than the first position.

13. The method of claim 11, wherein the air-flow control apparatus includes one of a fan and a grille shutter and an active side air intake.

14. The method of claim 13, wherein the air-flow control apparatus is the fan.

15. The method of claim 14, further comprising the step of activating the fan by one of selectively engaging a clutch drivingly connecting the fan to a vehicle engine, and energizing an electric fan motor.

16. The method of claim 11, further comprising the step of selecting the second position so as to deactivate the air-flow control apparatus.

17. The method of claim 11, wherein the first position is a spacing of the first vehicle behind the second vehicle.

18. The method system of claim 11, wherein the first position is a lateral offset of the first vehicle relative to the second vehicle.

19. The method of claim 11, wherein the vehicles are linked to each other through vehicle to vehicle communications.

20. The method of claim 19, wherein the vehicles are linked to a vehicle network beyond the vehicles.

* * * * *